United States Patent Office 3,634,475
Patented Jan. 11, 1972

3,634,475
METHOD FOR REMOVING METALS FROM VEGETABLE OILS
Robert E. Beal, Elmwood, and Roger A. Eisenhauer, East Peoria, Ill., assignors to the United States of America as represented by the Secretary of Agriculture
No Drawing. Filed Sept. 18, 1969, Ser. No. 859,199
Int. Cl. C09f 5/10
U.S. Cl. 260—428                                  4 Claims

ABSTRACT OF THE DISCLOSURE

The present invention is an improved low-cost continuous method for reducing the quantity of certain metals in vegetable oils intended for edible use, to near or below the levels where these metals adversely affect the flavor of the oil or the ability of the oil to resist oxidation. The method for reducing metals which constitutes the present invention consists in washing the vegetable oil in a multistage countercurrent manner with water which has previously been treated by passing it through a layer of a cation-exchange resin in the hydrogen form. After it has passed through the continuous countercurrent washing process, the water is again entirely passed through the resin layer and reused for washing a further quantity of oil. The same quantity of water is thus recycled and reused indefinitely and no further water is added to the process, except to replace losses due to evaporation or by other means.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

Vegetable oils, such as soybean, cottonseed, safflower oils, and the like are separated from the corresponding oil-bearing seeds by mechanical pressing or solvent extraction. They are known as crude oils at this stage. To prepare them for edible use, they are then alkali refined, bleached, usually hydrogenated, and deodorized. At all stages of processing, the presence of small amounts of certain metals in the vegetable oil is of concern to oil processors. Iron and copper, especially when combined with fatty acids, are typical pro-oxidant metals frequently found at troublesome levels in crude vegetable oils and probably derived from the seed from which the oil was obtained or by corrosion from processing equipment. Sodium from the sodium hydroxide used in alkali refining can have a bad effect on the flavor of the oil, as can nickel derived from a hydrogenation catalyst, when these are present above certain levels. When they are in an active form, for example as a fatty acid salt, iron at a level above about 0.3 part per million (0.00003%) or copper above about 0.03 part per million, adversely affect the flavor and stability of soybean oil. Certain stabilizers, for example citric acid, are usually added to vegetable oils to render these metals inactive when they are present at slightly higher levels. However, removal of iron and copper to near these levels is necessary because of the legal permissible limits on the use of such metal inactivators, the cost of inactivators, and their loss of effectiveness under some conditions of use of the edible oil products. Sodium or nickel levels above about 0.5 part per million are detrimental to the flavor of an edible vegetable oil.

For the first step in preparing an edible oil, crude vegetable oils are mixed with an aqueous solution of sodium hydroxide and centrifugally separated into soapstock and refined oil fractions. The soapstock fraction contains substantially all of the phosphatides and fatty acids from the crude oil, as well as some of the metal contaminants and other minor constituents. The refined oil is then washed with hot water and centrifuged to wash out soaps not removed from the oil in the refining step. The water from the washing step, containing a substantial biological oxidation demand, is discarded into sewage disposal plants or into streams. One object of the present invention is to provide an improved method for removing residual soaps from refined vegetable oil, whereby there is no effluent water stream to be disposed of which can contaminate natural water sources or overload disposal plants.

Alkali-refined, washed vegetable oils are treated with bleaching earth as the next step in the process of preparing an edible oil. A primary purpose of the bleaching treatment is to reduce the soap content of the oil by absorption on the bleaching earth to a level of 5 to 10 parts per million, a level considered satisfactory for edible oils. A further object of the present invention is to reduce the soap content of refined oil to the level of 5 to 10 parts per million by countercurrent washing with cation resin treated water so that the amount of bleaching earth required in the bleaching step may be substantially reduced, and the loss of oil absorbed by the earth thus also reduced. After one use, bleaching earth is discarded. Therefore, reducing the amount of earth used for bleaching vegetable oils will reduce the disposal problem.

Refined and bleached vegetable oils are usually subjected to partial hydrogenation to convert them to solid fats suitable for use in vegetable shortening or margarine products. Soybean oil is also frequently subjected to only slight hydrogenation to reduce the linolenate content of the oil to about 3 percent. After the oil has been hydrogenated, the catalyst is filtered out and the oil is cooled to about 4° C. and again filtered to remove crystallized fat and give a liquid oil fraction suitable for marketing as a stable salad oil. Usually the catalyst used for hydrogenation consists of reduced nickel, in an oil or fat carrier, to protect it from oxidation. Instead of reduced nickel catalyst, a copper-chromite catalyst of the Adkins type can be used to advantage for catalyzing the partial hydrogenation of soybean oil since it promotes a highly selective reaction whereby the linolenate in the oil, which principally accounts for the instability of the oil, is selectively reduced with a minimum reduction of the nutritionally desirable linoleate. Either nickel or copper-chromite catalysts when used in the hydrogenation of vegetable oils introduce the corresponding metals into the oils in dissolved form, but nickel can be tolerated at a higher level than copper. Hydrogenated oils are usually bleached to reduce the level of metal remaining in the oil. An object of the present invention is to provide a more economical and more effective method for the removal of undesirable metal contaminants from hydrogenated vegetable oils in order to increase the stability of the oil. Since the fatty acid salts of copper, nickel, and iron are but slightly soluble in water, it is indeed unexpected that countercurrent washing with cation-free water should be found to remove such cations from the oil as shown in the examples below.

SUMMARY OF THE INVENTION

The primary objective of the instant invention is to reduce the amount of metallic cations, especially sodium, iron, copper, and nickel, in vegetable oils to a point where they will have no adverse effect on the oils.

The process is applicable to any vegetable oil containing a deleterious amount of said metallic cations. In the examples below, commercially refined and bleached soybean oil, the same oil hydrogenated with copper-chromium-barium catalyst, and the same oil hydrogenated with a nickel catalyst, were chosen as typical examples of the above-mentioned vegetable oils. Removal of cations from oils is accomplished by washing with water essentially freed of cations by a cation-exchange resin. Said resin is put in the hydrogen form by washing with hydrochloric acid followed by a distilled water wash to remove excess acid. After washing metallic cations from the oil, the water is again freed of cations by the resin and recycled through the oil. Removal of metallic cations can be done in a batch process; i.e., putting the oil, water, and exchange resin together in a mixer. However, it is obviously better to have a continous process. The instant invention effects a continuous operation by running the oil and cation-free water countercurrently by the use of such apparatuses as centrifugal countercurrent contactors or rotating disc contactors.

Vegetable oil and cation-free water are heated to about 170°–185° F. before being fed into a countercurrent contactor from opposite directions. As the two liquids come in contact, mixing takes place. The oil then percolates through the water due to the difference in densities, and the two phases separate. The washed oil is collected from one outlet, and the wash water from another outlet is recycled through the cation-exchange resin and returned to the contactor. In this way, a relatively small amount of water, depending on the size of the contactors, can be used to wash a large amount of oil. Therefore, the problem of waste disposal is practically eliminated.

The following examples will serve to better illustrate the objects and advantages of the subject invention.

EXAMPLE 1

Approximately 50 gallons of refined, unwashed soybean oil obtained from a commercial vegetable oil refinery was washed in a Podbielniak centrifugal countercurrent contactor which had 18 mixing and settling stages and a maximum rated feed rate capacity of 500 milliliters per minute combined feed streams. The oil was pumped through a preheater to raise its temperature to about 170° F., then into the light-phase inlet of the contactor, and the water for washing the oil was heated to about 170° F. and pumped into the heavy-phase inlet of the contactor. The pumping rate for the oil was 85 milliliters per minute and for the water 115 milliliters per minute. After the oil and water passed countercurrently through the mixing and settling zones of the contactor, the washed oil was collected. The wash water was passed through a 10-inch deep bed of Amberlite IR–120 cation-exchange resin, which had previously been washed with hydrochloric acid to put it in the hydrogen form, and then with distilled water to remove excess acid. After passing through the cation-exchange resin, the water was again pumped through the preheater and through the countercurrent contactor. In this manner, 50 gallons of oil was washed with only 3 liters of water which was recycled continuously through the cation-exchange resin, through the contactor, and back through the resin.

After the system was in operation until equilibrium was reached, samples of oil and water streams were taken which analyzed as follows:

|  | Sodium cation content, p.p.m. | pH |
| --- | --- | --- |
| Soybean oil to contactor | a 6.3 |  |
| Soybean oil from contactor | b 0.2 |  |
| Wash water to contactor | 0.08 | 3.8 |
| Wash water from contactor | 3.0 | 3.8 | a Soap equivalent=82 p.p.m.
b Soap equivalent=2.6 p.p.m.

Although the water originally introduced into the washing cycle was distilled water, its pH gradually decreased during recycle operation until it reached a constant pH of about 3.8.

EXAMPLE 2

Four liters of commercial refined, bleached soybean oil was partially hydrogenated in a stainless steel reactor under the following conditions:

Catalyst—0.2% Rufert reduced nickel in hardened oil (24.6% Ni in oil)
Temperature—150°–170° C.
Hydrogen pressure—5 pounds per square inch gauge
Agitation—1,200 r.p.m., gas dispersion-type agitator The oil and catalyst were heated to 150° C. under vacuum and the hydrogen was then introduced and the reaction continued for 20 minutes. The reactants were then rapidly cooled to 70° C. and filtered to separate the catalyst from the oil. The oil was countercurrently washed in the Podbielniak contactor as in Example 1 at about 170° F. with an oil feed rate of 60 milliliters per minute and a recycle water feed rate of 110 milliliters per minute. After the countercurrent washing had been continued for 1 hour, during which time the water recycled through the hydrogen form cation resin (bed depth 20 inches) three times, samples were taken of the various oil and water streams and analyzed as follows:

|  | Ni cation, p.p.m. | pH |
| --- | --- | --- |
| Hydrogenated oil to contactor | 0.6 |  |
| Hydrogenated oil from contactor | 0.2 |  |
| Water to contactor | 0.0 | 3.9 |
| Water from contactor | 0.13 | 3.8 |

Thus, the washing operation removed about 65 percent of the nickel in the original hydrogenated oil.

EXAMPLE 3

Fifteen gallons of commercial refined, bleached soybean oil was partially hydrogenated in a stainless steel reactor, and 1.0 percent of a commercial copper-chromium-barium catalyst was added to the oil to catalyze the hydrogenation reaction. The reaction was conducted at 170° C. under a hydrogen pressure of 30 pounds per square inch. The initial iodine value of the oil was 133 and when the iodine value had decreased to 116.5, the oil was cooled to 70° C. and the catalyst removed by filtration. The oil was washed countercurrently with water in a rotating disc contactor of the following description:

Height of glass column—48 inches
Diameter of glass column—1½ inches
Number and diameter of rotating discs—6, 1-inch
Speed of revolution of discs—180 r.p.m.

The column was heated by an external water jacket held at 176°–185° F. The partially hydrogenated soybean oil was pumped into the bottom of the contactor column at a rate of 1,040 milliliters per hour, and water, after passing through a 12-inch deep bed of cation resin (Dowex 50 X–4) in the hydrogen form, was pumped into the top of the column at a rate of 1,010 milliliters per hour. The oil flowed upward through the column and the water downward because of the difference in their specific gravities. The oil-water interface was maintained about 2 inches below the lowest of the rotating discs, which were spaced at equal intervals throughout the column, by withdrawing water from the bottom of the column at the proper rate. After the column had been operated at steady state with water recycle through the resin several hours, samples were taken for analysis.

|  | Copper cation content, p.p.m. | pH |
| --- | --- | --- |
| Feed soybean oil to contactor | 1.1 |  |
| Product soybean oil from contactor | 0.09 |  |
| Recycle water from resin |  | 3.5 |

Before it was hydrogenated, with the copper-chromium-barium catalyst added to promote the reaction, the soybean oil contained 0.12 part per million of copper.

We claim:
1. A continuous process for reducing the amount of metal cations in vegetable oils which comprises washing said vegetable oil in a countercurrent manner with water which has previously been passed through a bed of cation-exchange resin in the hydrogen form, removing the washed oil, recycling the wash water through the said cation-exchange resin and subsequently returning the recycled water to wash another quantity of the vegetable oil that contains metal cations.

2. A process as described in claim 1 in which said vegetable oil is alkali-refined soybean oil.

3. A process as described in claim 1 which said vegetable oil is refined and bleached soybean oil which has been hydrogenated with a nickel catalyst.

4. A process as described in claim 1 in which said vegetable oil is refined and bleached soybean oil which has been hydrogenated with a copper-chromium-barium catalyst.

References Cited

UNITED STATES PATENTS 2,795,543   6/1957   Opie _____ 260—419

LEWIS GOTTS, Primary Examiner

E. G. LOVE, Assistant Examiner

U.S. Cl. X.R.

260—409